INVENTOR.
ARTHUR E. VOGEL
BY
*Schmieding and Fultz*
ATTORNEYS

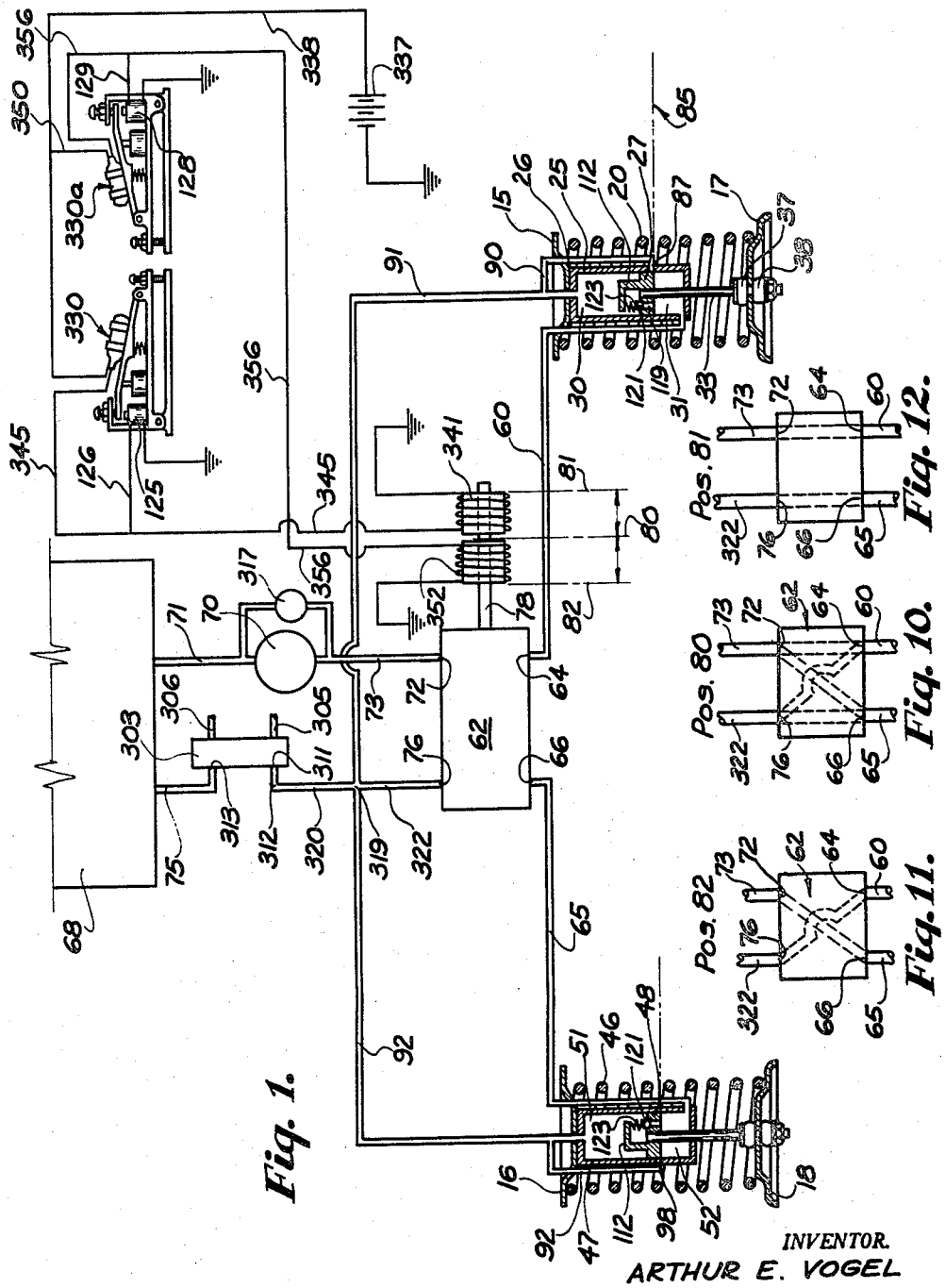

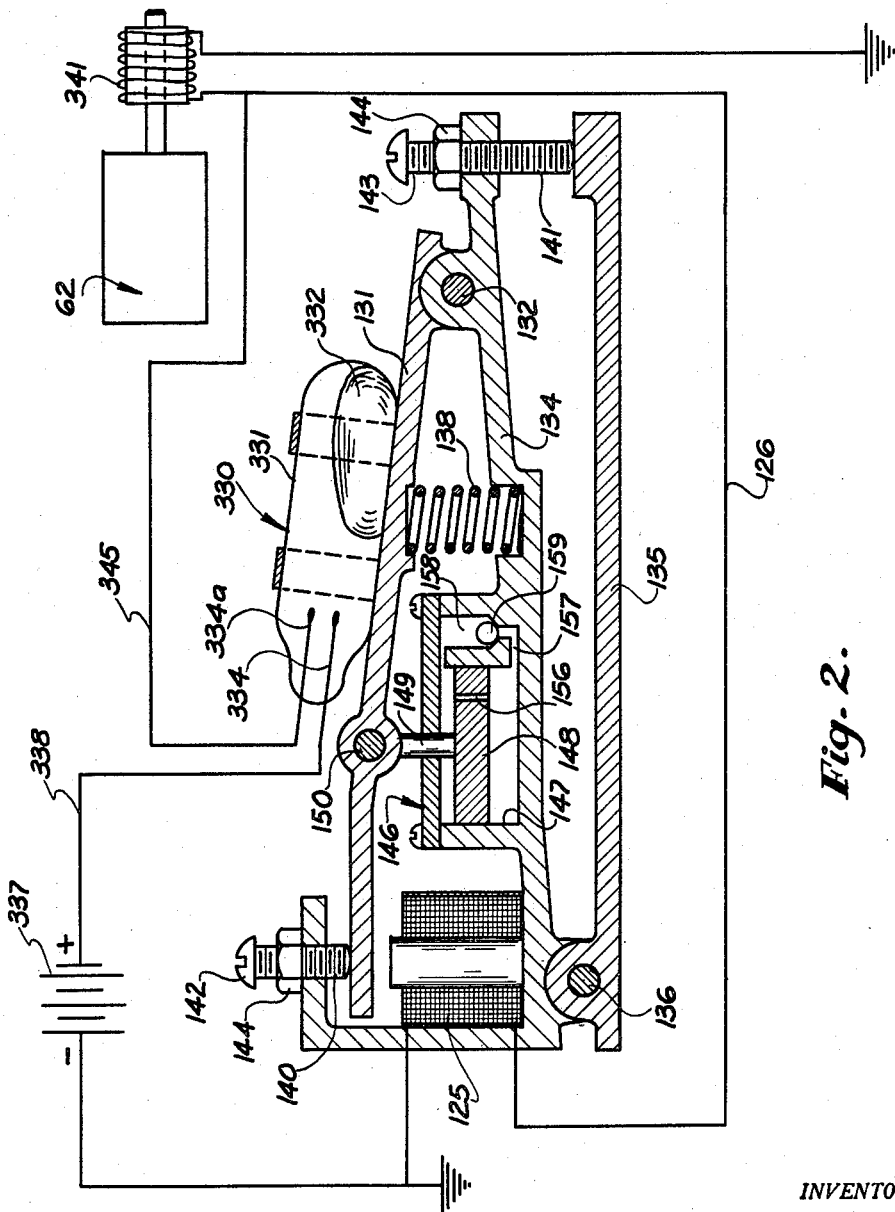

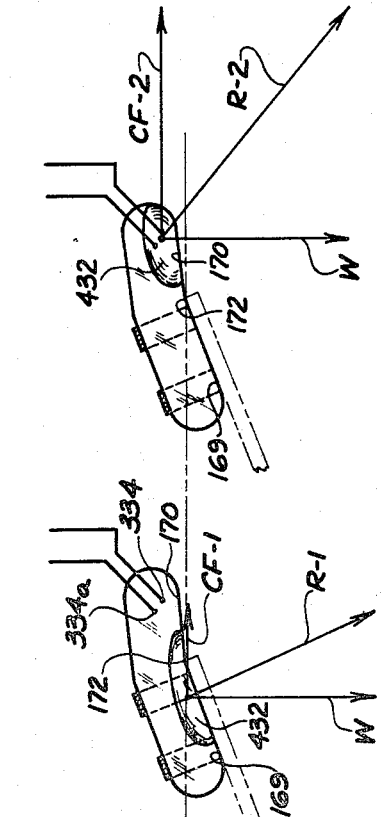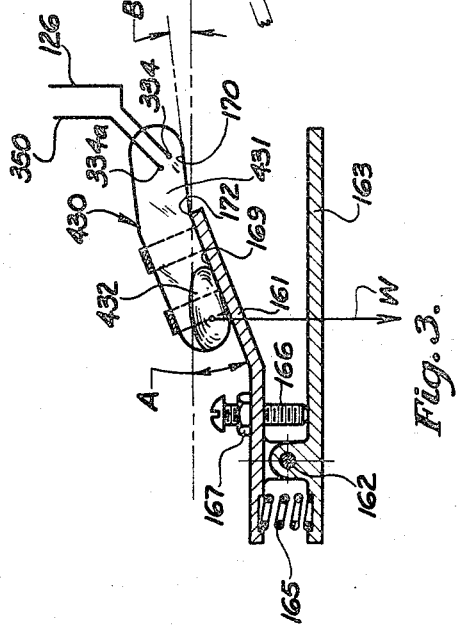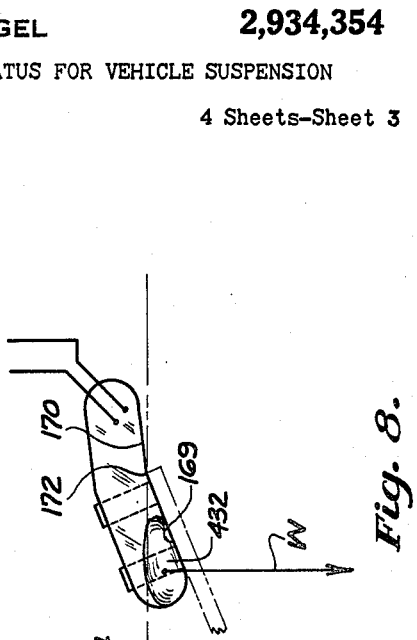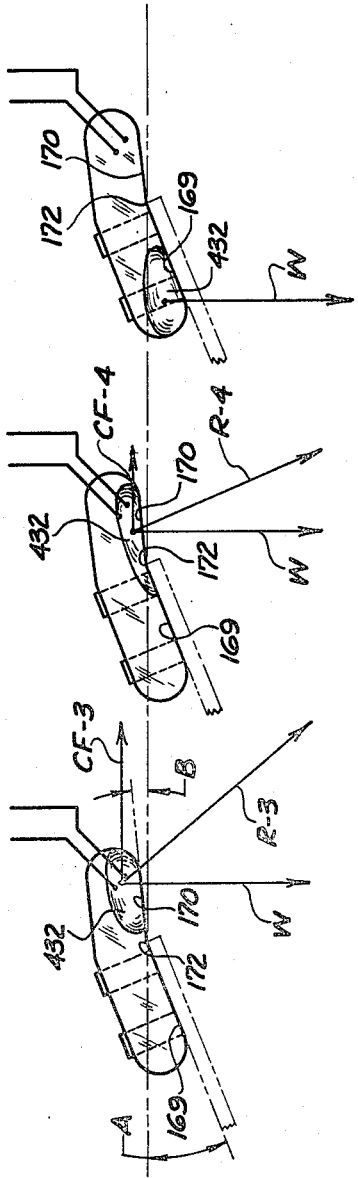

United States Patent Office 2,934,354
Patented Apr. 26, 1960

---

2,934,354

MERCURY SWITCH CONTROLLER APPARATUS FOR VEHICLE SUSPENSION

Arthur E. Vogel, Columbus, Ohio, assignor, by direct and mesne assignments, of one-half to Dawson-Vogel Engineering Company, one-fourth to Warren H. F. Schmieding, and one-fourth to Palmer Fultz, Columbus, Ohio Application March 21, 1956, Serial No. 572,919

17 Claims. (Cl. 280—112)

The present invention relates to suspension systems for vehicles and more particularly to apparatus for improving the cornering characteristics of a vehicle while the vehicle is negotiating a curve.

The conventional motor vehicle is provided with resilient means, such as springs, between the body and the wheels of the vehicle so that resilient means will absorb shocks and jars of the vehicle to provide safer and more comfortable riding for the occupants.

When the vehicle is rounding curves, however, the resilient means at the wheels, on the side of the vehicle nearer to the center of the curve, push upwardly on such side of the vehicle, due to the fact that energy is stored in such resilient means by the normal weight of the vehicle. Such upward force assists to disturb the stability or actually upsets the vehicle when rounding a curve by augmenting the centrifugal force that is concurrently exerted on the vehicle due to the fact that the vehicle is undergoing a change in direction.

The present invention constitutes an improvement of the disclosures in my co-pending applications Serial No. 332,651, filed January 22, 1953; Serial No. 519,038, filed June 30, 1955, now abandoned, and Serial No. 541,370, filed October 19, 1955, now abandoned. The control mechanism disclosed in this instant application is applicable to the apparatuses described in the aforementioned applications, and, when applied to such apparatuses, improve the function thereof.

The apparatus herein described, and described in the aforementioned co-pending applications, eliminates a force detrimental to the cornering function of a vehicle by decreasing the effect of the stored energy in the resilient means on that side of the vehicle body which is nearer to the center of the curve being negotiated. Other advantages of this apparatus are set forth in detail in the above-mentioned co-pending applications.

In apparatus of this type, an automatic control system is employed which is adapted to apply confining action for preventing the unloading of stored energy in the resilient means between the wheels and the body of the vehicle. Such control system utilizes mechanism which is responsive to centrifugal force generated when the vehicle is negotiating a curve.

When spring energy is confined by a confining means at the side of a vehicle nearest the center of a curve being rounded, the body of the vehicle is also confined to a "no tilt" or confinement configuration datum as is described in detail in my co-pending application Serial No. 541,370, filed October 19, 1955, and co-pending application Serial No. 541,337, filed October 19, 1955. The present invention relates to an improved primary controller for suspension control systems of the types described in these co-pending applications and to other controlled suspension systems wherein a fluid translating means, such as a pump, is utilized to power a confining means for the suspension system.

In some instances control systems for vehicle suspension systems have included fixed or constant incline mercury controllers, or switches, as a means for sensing centrifugal force. On such fixed incline switches the inclined surface along which the mercury must travel, in making an electrical contact to energize the control system, has been disposed at a constant or fixed angle of incline whereby the mercury must move down the same angle of incline in breaking the electrical contact to deenergize the system. Hence the moment of force of centrifugal force at which the confining means is energized has been the same as the moment of force of centrifugal force at which the confining means is deenergized. This lack of a differential in the magnitude of centrifugal forces i.e. the lack of a system wherein a greater magnitude of centrifugal force is required to energize the confining means than the magnitude required to deenergize same, produces an undesirable transition sensation, detrimental to passenger comfort, at a certain intensity of centrifugal force to which the vehicle must be exposed in undergoing a transition period which occurs when leaving a straight road, in entering a curve, and when leaving the curve to enter a straight stretch of road. Under certain road conditions said certain intensity of centrifugal force may be encountered for a considerable period of time, and when the stabilizing system is of the type wherein a fluid translating apparatus, such as a pump, continuously translates fluid to a confining means at spring means of the vehicle then an undesirable transitional effect detrimental to riding comfort will occur. Such pump actuated systems are described in detail in my previously mentioned co-pending applications Serial No. 541,337, Serial No. 541,370, and Serial No. 332,651.

Such pump actuated systems provide an undesirable transition sensation, at a certain centrifugal force intensity mentioned above, and when a fixed or constant incline mercury controller is used, due to the fact that at said above described certain intensity of centrifugal force the mercury will have been moved up the fixed or constant incline to a "twilight zone" whereat the mercury oscillates between make and break relationship with the electrical contacts at the upper end of said fixed or constant incline type of mercury controller. When the mercury makes contact at said twilight zone the powered confining means will pull the inner side of the vehicle, the side nearest the center of the curve, downwardly relative to a normal confinement configuration datum for the suspension system. This action will, at said certain centrifugal force intensity, tilt the vehicle body and the fixed or constant incline mercury controller to a lesser angle of incline whereat the mercury, being at the twilight zone of engagement with the electric contacts, will move away from a contact making position. The confining means is thereby deenergized and inner side of the vehicle will then rise relative to the normal confinement configuration datum, towards which the pump and confining means had just moved it. Hence the vehicle will lean outwardly, the incline of the fixed incline mercury controller will decrease, and the mercury being at the twilight zone of making contact, will quickly reenergize the powered confining means. The inner side of the vehicle will as a result be again moved downwardly relative to the confinement configuration datum line and the cycle of roll will repeat itself whereby the vehicle is subjected to an unpleasant oscillation about its longitudinal axis of roll.

According to the present invention, novel mercury actuated controllers are provided for automatically energizing and deenergizing the confining means of a stabilizing system, yet these novel controllers are never subjected to a condition wherein the mercury rides at the above described twilight zone position wherein said above described certain intensity of centrifugal force would subject the vehicle to roll oscillations. Hence transitional ride sensations, detrimental to passenger comfort, are avoided.

In the present invention, I provide a differential between the moment of force of centrifugal force at which the confining means is cut in and when the confining means is cut out, i.e., the confining means is not cut out until the centrifugal force has been reduced to a value somewhat less than the value of the centrifugal force at which the confining means was cut in.

Further objects and advantages will be apparent from the following description, reference being had to the accompanying drawings wherein preferred embodiments of the invention are illustrated.

In the drawings:

Fig. 1 is a diagrammatic view showing an apparatus constructed according to the present invention and applied to a typical suspension system of a motor vehicle;

Fig. 2 is a longitudinal cross-sectional view of one of the controllers of the present invention, and showing diagrammatically an electrical system controlled by the controller;

Fig. 3 is a longitudinal sectional view through another controller which may be substituted for the controller shown in Fig. 2, showing another aspect of the present invention;

Fig. 4 is a diagrammatic view of the mercury switch shown in Fig. 3, but showing the mercury being raised, due to centrifugal force, to a higher level than that shown in Fig. 3;

Figs. 5 and 6 are diagrammatic views showing the position of the mercury after the moment of force of centrifugal force attained a predetermined high value;

Fig. 7 is a diagrammatic view showing the position of the mercury when the moment of force of centrifugal force has decreased to a predetermined value at which, at a slightly further decrease of value, the mercury will separate from its contact-bridging position;

Fig. 8 is a diagrammatic view showing the position of the mercury as shown in Fig. 3, that is, after the centrifugal force has decreased below a predetermined high value;

Figs. 10, 11 and 12 are diagrammatic views of a control valve showing the same in various positions.

Figure 9:
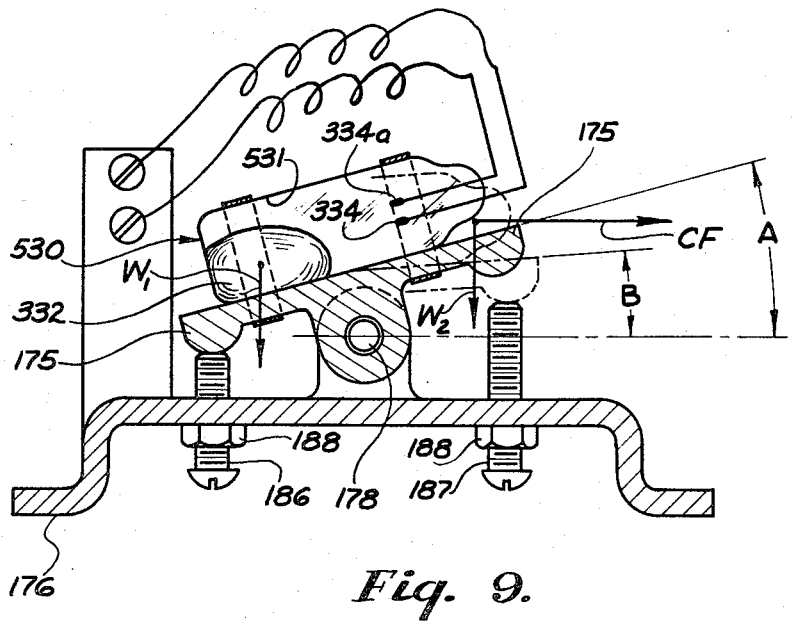
Fig. 9 is a side view of another controller showing another aspect of the invention.

Referring first to Fig. 1, the conventional frame (not shown) of a vehicle has attached thereto a left spring saddle 15 and a right spring saddle 16, said saddles comprising part of the sprung weight of the vehicle. Lower spring saddles 17 and 18 constitute part of the unsprung weight of the vehicle, as is clearly shown and described in the aforementioned copending application Serial No. 519,038 and Serial No. 541,370. A left front spring 20 is interposed between the sprung weight (frame and body) and the unsprung weight (the left front wheel).

A hydraulic confining cylinder 25 is secured to the saddle 15 as at 26, the cylinder being fitted with a piston 27 which isolates an upper chamber 30 and a lower chamber 31. Piston 27 is carried on a rod 33 which is connected to the lower control arm assembly through the saddle 17, such that relative movement, between the frame and the unsprung weight, causes piston 27 to reciprocate in cylinder 25. The rubber elements 37 and 38 provide a cushioned flexible connection between rod 33 and the lower saddle 17. Similar parts are provided at the right side of the vehicle. The important elements for understanding the present invention consist of the right spring 46 which is interposed between saddles 16 and 18, a hydraulic confining cylinder 47 provided with a piston 48 which divides the cylinder into an upper chamber 51 isolated from a lower chamber 52.

A hydraulic tube 60 connects the lower chamber 31, of confining means 25, with a valve 62 at a port 64. A tube 65 connects lower chamber 52, of the confining means 47, to valve 62 at a port 66. A reservoir 68 continues to supply hydraulic fluid to valve 62 by a fluid-translating means, such as a pump 70, which receives fluid from reservoir 68 through a tube 71 and delivers fluid to a port 72 of valve 62 through a tube 73. A hydraulically actuated motor controller is diagrammatically shown at 303. This controller is of the conventional type used in the current model automobiles of 1955. It is of the type which will connect a hydraulic motor to the steering column, to augment manual turning of the column, when a predetermined turning pressure, say two pounds, is applied manually to the column. The motor (not shown) is connected with the controller by hydraulic tubes 305 and 306. A restrictor, usually in the form of a small orifice, is provided at the inlet side 311 of the controller 303. This restrictor is indicated at 312. The outlet side 313 of the controller 303 is connected by tube 75 to the reservoir 68.

The pump 70 is of the constant volume type, and for this purpose it is provided with a relief valve 317. This pump is conventional for current model automobile hydraulic steering mechanisms. In that product, the relief valve, diagrammatically shown at 317, is incorporated in the pump. Hydraulic fluid is delivered from valve 62 through its outlet port 76, tubes 322 and 320, through restrictor 312.

The valve 62 is preferably of the three-position, open center type arranged to form a common connection between the four ports, 64, 66, 72 and 76, when an actuating rod 78 is at a central position, the central position 80 being indicated in Fig. 10. When rod 78 is shifted to the right position, as seen in Fig. 12, port 72 is connected only with port 64, whereby lower chamber 31 of confining means 25 is connected to pump 70, and port 76 is connected only with port 66, whereby lower chamber 52 of confining means 47 is connected to reservoir 68.

It will be noted that, with the valve 62 in such position 81, the left confining means 25 is placed in circuit with pump 70 with the right confining means 47 isolated from the effect of the pump 70. Such high pressure connection of one of the confining means, and isolation of the other confining means, may be effected by a single valve of the appropriate type described above.

With the valve 62 shifted to the other position 82, as seen in Fig. 11, port 72 is connected only with port 66, whereby the high pressure side of the pump is connected to the lower chamber 52 of the right confining means, and port 76 is connected only with port 64, whereby the lower chamber 31 of the left confining means 25 is placed in open communication with reservoir 68.

Therefore, it will be seen that valve 62, being of the three-position, open center, spool type, serves as a single valve unit for either connecting left confining means 25 with the high pressure side of the pump 70, while the right confining means 47 is completely isolated from the effect of the pump, or, for connecting right confining means 47 with the high pressure side of the pump 70 while completely isolating confining means 25 from the effect of the pump.

In view of the above, it will be understood that when the left confining means is connected to the high pressure side of the pump, with valve 62 in position 81, an upwardly directed force will be exerted on the underside of piston 27, due to the fluid pressure in lower chamber 31 as long as the under surface of piston 27 is located at or below a confinement position datum line indicated at 85. This condition will be true since, according to the present invention, a position command orifice 87 is closed against the escape of hydraulic fluid when the lower surface of piston 27 is at or below the confinement position datum line 85. Moreover, when fluid pressure is present in lower chamber 31, due to the position command orifice 87 being closed by piston 27, a confining action will be exerted on vehicle spring 20, whereby such spring will be prevented from unloading stored spring energy when the vehicle is negotiating a curve.

It will be further understood that pressure is automatically produced in chamber 31, responsive to the action of a suitable control means hereinafter to be described, adapted to move valve 62 to either position 81 or 82, when the vehicle is negotiating either a left or right turn, respectively. When the valve 62 is in position 81, the confining means 25 is nearest the center of the curve being negotiated. Then the vehicle spring at the inner side of the vehicle will be prevented from unloading stored spring energy on the sprung weight on such side, which unloading if allowed to occur, would augment centrifugal force and cause outward leaning or actual upsetting of the vehicle.

Assuming that the left confining means 25 is connected to the fluid-translating pump 70, it will be understood that when piston 27 is driven upwardly with the unsprung weight, which action occurs when the inner wheel, constituting a portion of such unsprung weight, strikes a protruding bump while the vehicle is cornering to the left, then the positive command orifice will open, whereby fluid is free to leave lower chamber 31 through such orifice. It will be observed that when fluid leaves positive command orifice 87, it passes through a tube 90 which connects with a fluid return tube 91. This tube 91 is connected at 319 with tubes 320 and 322, tube 320 being connected through the controller 303 and pipe 75 with the low pressure reservoir 68.

After the upward departure of piston 27 above confinement datum line 85, and as long as piston 27 is above such datum line, pump 70 delivers fluid through tube 73, valve 62, tube 60, lower chamber 31 of the confining means 25, and then outwardly through positive command orifice 87. Hence no fluid pressure is available for maintaining piston 27 at any position above the datum line 85. When piston 27 returns downwardly, after the effect of the impact of the protruding bump, it will continue such downward movement to the datum line 85, and, as the lower surface of piston 27 reaches datum line 85, the position command orifice 87 will close, causing pressure to be present in lower chamber 31.

Due to the downward movement, after impact of the protruding bump, of the unsprung weight, produced by the expanding action of the spring 20 and the static weight of the unsprung weight, extreme impact forces would occur, and extreme pressures would be experienced in the lower chamber 31, if piston 27 were to be immediately arrested, in its downward travel, when its lower surface arrives at confinement datum line 85. Accordingly, a fluid pressure limiting means, indicated generally at 112, is provided to permit the escape of hydraulic fluid from the high pressure pump circuit, with such escape of fluid being completely prevented below a predetermined fluid pressure value, which pressure value is predetermined to be of sufficient magnitude to effect the desired spring energy confinement, at spring 20, against any magnitudes of centrifugal force to be encountered by the particular vehicle.

It has been discovered, according to the present invention, that only a relatively small confining force of approximately 500 pounds, applied at the location of spring 20, is sufficient to effect the desired results of the present invention for a conventional passenger motor vehicle. Such force is sufficient to effect complete spring confinement, at normal configuration datum, for the most severe centrifugal force values ever encountered in operating a typical passenger motor vehicle. Such predetermined force value will, of course, vary with different vehicles, depending on the physical characteristics such as the weight and suspension geometry.

The particular fluid pressure limiting means 112 comprises a passage 119 through the piston 27, a ball valve 121 adapted to close the passage 119 and a spring 123 which normally urges the ball valve 121 toward its closed position.

It will be understood that the preloaded force, exerted by spring 123 in retaining ball valve 121 on its seat, is determined by appropriate calculations to determine a yield pressure at which valve 121 will be forced open by fluid action from the high pressure portion of the hydraulic circuit. Such yield pressure is determined to correspond to the particular predetermined confining force required at vehicle spring 20 to prevent such spring from unloading energy under the most adverse centrifugal force conditions to be encountered by the particular vehicle.

The above-described yield pressure value, at which the escape of fluid from the high pressure portion of the circuit to the reservoir occurs during the downward travel of piston 27 beyond the position demand orifice 87, is established at the lowest pressure value which will produce the required confinement. As a result, the unsprung weight, including the wheel, can readily travel downwardly, below the confined suspension configuration when rough road conditions are encountered. Hence the wheel will follow the uneven portions of the road surface, which, when the vehicle is cornering, will provide superior riding characteristics.

Referring to the right confining means 47, it will be understood that a position command orifice 98, and tube 92 leading back to the reservoir, serve to maintain and return the right confining means 47 at the confined position datum line 85 in the same manner described above for left confining means 25. Tube 92 is connected at junction 319 with tubes 91, 322, and 320, line 320 leading back to the reservoir, as was previously explained. The confining action, just described, at the right confining means 47, occurs only when the vehicle is turning to the right, at which time valve 62 is at position 82 wherein the pump delivers fluid to lower chamber 52 of the confining means 47, and wherein the left confining means 25 is isolated from the high pressure portion of the circuit.

It will be understood that when either of the confining means 25 or 47 is isolated from the high pressure portion of the circuit by valve means 62, which condition occurs when the vehicle is turning in a direction away from the non-actuated confining means, then such non-actuated confining means will have no effect on its respective suspension side but will merely follow the normal upward and downward movement of the suspension. This will occur because, in such instances, both the upper and lower chamber of the particular non-actuated confining means will be connected only with reservoir and isolated from the high pressure portion of circuit. As a result of such complete isolation of the two confining means, one from the other, the upper and lower chambers of the non-actuated confining means are pressure balanced at low values and the suspension side that it is adapted to control will possess its normal freedom to follow protrusions and depressions in the road independently of any interconnection with and effect from the actuated confining means at the other suspension side, which other suspension side is being independently controlled by said actuated confining means.

When the vehicle is traveling in a straight path each of the ports 64, 66, 72, and 76 of valve 66 are commonly connected whereby the upper and lower chambers of each of the two confining means 25 and 47 are pressure balanced at some low pressure value due to the slight back pressure imposed by restriction in line 320 to the flow of fluid from pump 70 back to reservoir 68. Such restriction may be provided by a power steering unit 303 or by other fluid restricting means as explained in the previously mentioned co-pending application Serial No. 541,370.

Two opposing springs (not shown) normally urge the valve 62 toward its neutral position, i.e., its position 80, so that when extraneous force, being applied to valve rod 78, is released, the valve 62 will be returned to its position 80. Valve 62 is moved from position 80 to its position 81 by a solenoid coil 341 and is moved from position 80 to its position 82 by a solenoid coil 352. Coil 341 is energized when the centrifugal force of a predetermined value is generated while the vehicle is negotiating a left turn. Coil 352 is energized when the centrifugal force of a predetermined value is generated while the vehicle is negotiating a right turn.

One form of controlling mechanism for the coils 341 and 352 is shown in Figs. 1 and 2. A mercury switch 330 includes a tube 331, mercury 332, and a pair of contacts 334 and 334a. When mercury bridges contacts 334 and 334a, a circuit is complete from a battery 337 through coil 341, said circuit including battery 337, wire 338, contacts 334 and 334a, wire 345, coil 341 to ground. Contacts 344 and 344a are bridged when the centrifugal force of a predetermined value is generated while the vehicle is negotiating a left turn. As previously pointed out, at this time value 62 will be shifted to its 81 position, Figure 12, and left confining means 25 is brought into action.

A second set of contacts like 334 and 334a are adapted to be bridged by mercury when the centrifugal force of a predetermined value is generated while the vehicle is negotiating a right turn. This second set of contacts may be embodied in the same mercury switch, as is described in my co-pending application, Serial No. 541,370, filed October 19, 1955, for all embodiments herein shown; however, for the sake of simplicity, I have provided two mercury switches for each embodiment. Referring particularly to Fig. 1, the second mercury switch is indicated at 330a. When contacts of said switch 330a are bridged, a circuit is completed through solenoid coil 352 to move the solenoid core 78 from its neutral 80 position, Figure 10, to its position 82, Figure 11, to thereby bring right confining means 47 into action. The circuit comprises battery 337, wires 338 and 350, mercury bridged contacts in switch 330a, wire 356, coil 352 to ground.

In all embodiments herein, I provide a differential between the moment of force of centrifugal force at which the confining means is brought into action and when the same confining means is rendered ineffective; i.e., the particular confining means, which had just been brought into action, is not rendered ineffective until the centrifugal force is reduced to a value somewhat less than the value of the centrifugal force at which the particular confining means was brought into action.

In the embodiment specifically shown in Figs. 1 and 2, an electromagnetic coil 125 is connected in parallel circuit relation with solenoid coil 341. The circuit for coil 125 includes battery 337, wire 338, contact 334, contact 334a, wire 345, wire 126, coil 125 to ground. Similarly, a coil 128 is connected in parallel circuit relation with solenoid coil 352. The circuit for coil 128 includes battery 337, wires 338 and 350, contacts 334 and 334a, wires 356 and 129, coil 128 to ground. When, for example, the centrifugal force attains the predetermined value which renders confining means 25 effective (in negotiating a left turn), then coil 125 is also rendered effective. Rendering of coil 125 effective will cause a decrease in the effect of the moment of force of gravity on the mercury, that is, the mercury is caused to be subjected to an inclining surface of lesser degree. This is accomplished in Fig. 2 by tilting the mercury tubes 331 farther toward a horizontal position.

In Fig. 2, the mercury tube 331 is carried by a lever 131, which latter is pivoted on pivot pin 132. Pin 132 is carried by a lever 134, which latter is pivotally mounted on a base 135 by a pin 136. Base 135 is suitably carried on a normally horizontally disposed part of the sprung weight of the vehicle, and normally base 135 lies in a horizontal plane but, of course, is tilted one way or the other with the sprung weight of the vehicle. Lever 131 functions as an armature, it being in the path of magnetic flux generated by the coil 125 when the latter is energized. Obviously, when the lever is lowered by the coil 125, the moment of force of gravity is decreased; consequently, the degree of centrifugal force necessary to hold the mercury in contacting relation is lessened from that which was required to move the mercury, up the inclined floor of the tube 331, to circuit-closing position. Therefore, the mercury will continue to bridge contacts 334 and 334a until the centrifugal force is decreased to a value less than that required to bridge the contacts by the mercury. When the centrifugal force is decreased to such value, the circuits to coils 341 and 125 are interrupted. Upon deenergization of coil 341, the spring (not shown) will move the valve from its position 81 to its neutral position 80, and armature-lever 131 will be returned by a spring 138 to the position shown in Fig. 2.

With continued reference to Figure 2, an adjusting means 141, in the form of a screw 143 and lock nut 144, may be provided for varying the angle of inclination of lever 131 relative to the horizontal. When the right end of lever 131, as viewed in Figure 2, is lowered, the mercury 332 will be forced to move up the increased angle of incline of the floor of the tube whereby contacts 334 and 334a will not be bridged by the mercury, to energize the circuit of the confining means, until a higher value of centrifugal force is encountered which value is higher than that required to energize the confining means circuit prior to said lowering of the right end of lever 131.

When adjusting means is used to raise the right end of lever 131 the converse will be true in that the mercury will bridge contacts 334 and 334a at a lower value of centrifugal force.

Reference is next made to the adjusting means 140, Figure 2, which includes a screw 142 and lock nut 144. Rotation of screw 142 serves to raise and lower the upper limit of movement of the left end of lever 131 whereby the gap between lever 131 and the top of the core of solenoid 125 can be selectively increased or decreased. Hence it will be understood that adjusting means 140 provides means for varying the differential of centrifugal force between the centrifugal force value at which the confining means 25 or 47 is rendered effective, and the lower centrifugal force value at which the confining means 25 or 47 is rendered ineffective.

The differential of centrifugal forces hereinbefore set forth is desirable, since without the differential, the confining means, for example 25, would be rendered effective and ineffective intermittently upon slight vehicle tilting or variance of centrifugal force while negotiating a left turn, resulting in unnecessary intermittent raising and lowering of the left side of the vehicle. By providing the differential, the confining means is not brought into action until needed, and it remains effective until the value of centrifugal force is lessened substantially below the value of centrifugal force which rendered the confining means effective. In this manner slight variance in centrifugal force, caused, for example, by slight decrease in speed or slight shifting of the vehicle toward straight forward movement, will not render the confining means ineffective.

To prevent a rapid upward movement of lever 131 and switch 330 upon rendering the confining means ineffective, I provide a dash pot mechanism 146 including a cylinder 147, a piston 148, and a rod 149 connecting the piston with the lever 131 by pin 150. The purpose of the dash pot is to prevent lever 131 from snapping rapidly upwardly and coming to an abrupt stop which prevented action would otherwise cause mercury 332 to splash back and forth between the walls of tube 331.

If the mercury 332 were permitted to splash back and forth in tube 331 the contacts 334 and 334a would be repeatedly bridged and broken whereby the confining means 25 or 47 would undergo alternate energizations and deenergizations. This would cause undesirable transition sensations to passengers when the confining means is being rendered ineffective in leaving a curve.

With continued reference to the dash pot 146 of Figure 2, a passage 157—158 connects the bottom of the cylinder, below the piston 148 with the top of the cylinder, above the piston. A check valve 159, in passage 157—158, however, prevents the flow of liquid or air from the top of the cylinder to the bottom thereof. Thus the piston moves downwardly freely, but its upward movement is retarded due to the restriction 156.

In the embodiment shown in Figs. 3 to 8 inclusive, one of the two mercury switches is shown at 430. It includes a tube 431, mercury 432 and contacts 334 and 334a. Tube 430 is carried by a lever 161, pivotally carried by a pin 162 by a base 163. This base 163 is mounted on the vehicle, as was explained with respect to base 135 of Fig. 2. A spring 165 normally urges the tube-carrying arm of lever 161 downwardly. The angular relationship of lever 161 with respect to base 163 is adjusted by an adjusting screw 166 which is locked in position by a lock nut 167.

The floor or tube 431 is provided with a lower section 169 which angles upwardly and merges with an upper section 170. The degree of angling of the lower section 169, with respect to a horizontal plane, is greater than that of the upper section 170. The angle of surface 169 to horizontal is indicated at "A" and the angle of surface 170 to horizontal is indicated at "B." As illustrated in this embodiment, the mercury moves outwardly toward the right in response to increase in centrifugal force. The mercury, of course, must also move upwardly when moving outwardly because of the inclining floor of the mercury tube. Since the incline of floor section 170 is less than floor section 169, the moment of force of gravity on the mercury is decreased after the mercury passes the apex 172—where section 169 joins section 170—while it is being moved outwardly by centrifugal force. In Figs. 3 to 8, "W" indicates weight of the mercury; "CF" indicates centrifugal force; and "R" indicates the resultant of gravity and centrifugal force. Fig. 4 depicts increasing of centrifugal force, i.e., the mercury is being moved outwardly and upwardly over floor surface 169 toward surface 170; some of the mercury has just passed over the apex 172; it will be observed that the mercury has not as yet bridged contacts 334 and 334a. Figure 5 represents the maximum centrifugal force value being encountered in the particular curve, and is represented by a vector CF–2 which is greater than the vector CF–1 of Figure 4. The vector CF–3 of Figure 5 represents the decreasing value of centrifugal force as the intensity of turning or speed of the vehicle is decreased. Hence vector CF–3 is shorter than vector CF–2. Fig. 7 depicts further decreasing of centrifugal force, i.e., the mercury is moving inwardly. Note that the resultant force R–1 of Fig. 4 and the resultant force R–4 of Fig. 7 are the same, yet in Fig. 7 contact is being maintained between the mercury and the contacts. That is because more energy must be expended in lifting the mercury up the higher incline 169 (Fig. 4) than is required to hold the mercury on the lesser inclined surface 170 (Fig. 7). Consequently, the mercury will not separate from the contacts until the centrifugal force is lowered to a value below that at which the mercury bridged the contacts. Hence with the embodiment of Figures 3 through 8 the previously mentioned differential in centrifugal forces is maintained and the mercury will not oscillate between make and break positions relative to the contacts 334 and 334a when a certain centrifugal force value is encountered in the transition period between deenergization and energization of the confining means 25 or 47.

In the embodiment illustrated in Fig. 9, the differential between bridging the contacts of the mercury switch 530 by the mercury and the separation of the mercury from the contacts, is controlled by changing the angle of the entire mercury tube. The tube 531 is carried by a lever 175. Lever 175 is pivotally carried on a base member 176.

Pivot pin 178 for lever 175 lies in a vertical plane substantially midway of the ends of mercury tube 531. Centrifugal force is indicated by the arrow "CF"; i.e., centrifugal force tends to and moves the mercury to the right. When no centrifugal force is being applied, or when the centrifugal force is below a predetermined value, the mercury will be in the position shown in full lines. The force of gravity on the mass of mercury is indicated at "$W_1$." At this time the angle of the floor of the tube will be that of "A" with respect to horizontal. When centrifugal force attains a predetermined value, i.e., when the mass of mercury moves a predetermined distance to the right beyond a vertical plane intersecting the axis of pivot pin 178, the lever 175 and tube 531 will be tilted toward horizontal, that is, to the angle "B." The mercury will then be in the dotted line position. Thus, while the mercury is being elevated by centrifugal force, the moment of the force of gravity on the mercury is decreased. Since the moment of force of gravity is decreased, the mercury will not separate from contacts 334 and 334a until the moment of force of centrifugal force decreases to a value below that at which the mercury bridged the contacts.

A screw 186 limits the extent to which the left end of the tube 531 can be lowered, and a screw 187 limits the extent to which the right end of tube 531 can be lowered. These screws are adjustable vertically and are held in locked position by lock nuts 188. By lowering screw 186, a greater value of centrifugal force must be had to bridge the contacts by the mercury; the converse is true when raising screw 186. The differential between the centrifugal force necessary to bridge the contacts by the mercury and the centrifugal force necessary for retaining the contacts bridged by the mercury, can be varied by manipulating screw 187; i.e., by lowering screw 187, the differential will be increased and by raising screw 187, the differential is decreased.

Thus, in this embodiment of Figure 9, I have provided not only a differential between the centrifugal force necessary to render the confining means effective and the centrifugal force present when the confining means is rendered ineffective, but I have also provided a simple mechanism for selectively varying the differential.

Figure 13:
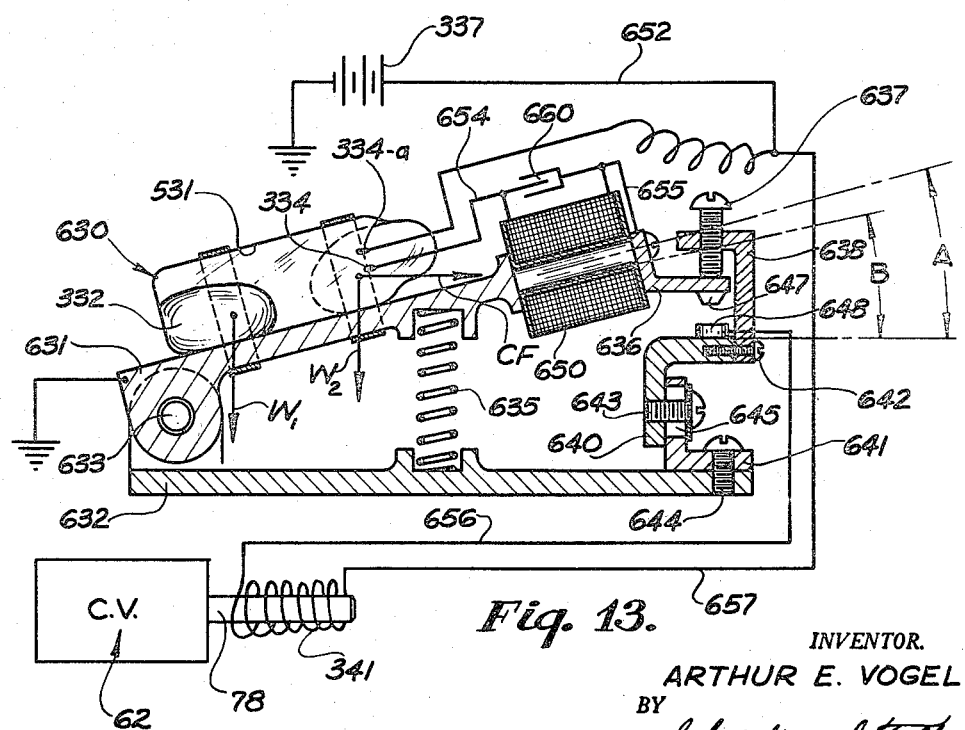
Fig. 13 is a side view of another controller showing another aspect of the invention.

In the embodiment of Figure 13 one of two mercury switches is shown at 630 and includes a tube 531, mercury 332, and contacts 334 and 334a. Tube 531 is carried by a lever 631 pivotally carried by a base 632 at a pin 633.

Base 632 is mounted on a vehicle and a spring 635 constantly urges end portion 636 of lever 631 upwardly against an adjusting screw 637 carried by a dielectric bracket 638.

The dielectric bracket 638 is vertically adjustably supported on base 632 by brackets 640 and 641 and screws 642, 643, and 644. When screw 643 is loosened in slot 645 the height of stop screw 637 and the height of contact 648 are varied relative to the base 632 to provide adjustment for the angle of inclination of lever 631 and tube 531.

An upper contact 647 is mounted on movable lever 631 at portion 636 and a lower contact 648 is supported on base 632 by brackets 640 and 641. A solenoid 650 is carried by arm 631 with such arm extending through the solenoid to form a core.

The lever portions 636 and 631, the base 632, and brackets 641 and 640 form a magnetic path which is normally broken by the gap between contacts 647 and 648 when the mercury and contacts are in the normal configuration illustrated in Figure 13. When mercury 332 bridges contacts 334 and 334a, due to centrifugal force imposed on the mercury when the vehicle encounters a curve, then solenoid 650 is energized by means of battery 337, wires 652, contacts 334 and 334a, line 654, coil 650, line 655, lever portions 636 and 631 to ground. The magnetic force created by solenoid 650 closes contacts 647 and 648 which energizes solenoid 341 to operate valve 62 in the manner previously described, the solenoid 341 being energized from battery 337 through wires 652, 657, solenoid 341, wire 656, contacts 648 and 647, arm portions 636 and 631 to ground.

At the same time solenoid 650 is energized a condenser 660 connected between wires 654 and 655 is charged to provide a holding circuit whereby solenoid 650, and hence solenoid 341, are maintained energized for a time interval after mercury 332 breaks contact with contacts 334 and 334a. Hence it will be understood that, with the aspect of Figure 13 when a road condition is encountered wherein mercury 332 splashes back and forth in tube 531, then the solenoids will not be alternately energized and deenergized and valve 62 will not be alternately shifted between positions. Hence the previously described confining means will not be rapidly pressurized and depressurized by the splashing mercury. It will further be understood that with the embodiment of Figure 13 the angle of inclination of tube 531 at which the mercury breaks contact with contacts 334 and 334a is automatically decreased relative to the angle of inclination at which the mercury makes contact for the reasons previously described herein.

While the forms of embodiments herein shown and described constitute preferred forms, it is to be understood that other forms may be adopted falling within the scope of the claims that follow.

I claim:

1. In a vehicle provided with a controlled suspension system the combination of a switch wherein mercury is shifted from one level to another level to connect spaced contacts and thereby control a circuit; a mercury supporting surface inclined relative to the horizontal for causing mercury to be shifted from one level to a higher level by centrifugal force encountered by said vehicle; and means for causing decreasing effect of the moment of force of gravity, on the mercury, said means being operatively responsive to the moment of force of centrifugal force attaining a predetermined high value.

2. In a vehicle provided with a controlled suspension system the combination of a switch wherein mercury is shifted from one level to another level to connect spaced contacts and thereby control a circuit; a mercury supporting surface inclined relative to the horizontal for causing mercury to be shifted from one level to a higher level by centrifugal force encountered by said vehicle; means for causing decreasing effect of the moment of force of gravity, on the mercury, said means being operatively responsive to the moment of force of centrifugal force attaining a predetermined high value; said means being adapted to maintain the decreased effect of the moment of force of gravity, on the mercury, until the moment of force of centrifugal force decreases to a value below said predetermined high value.

3. In a vehicle provided with a controlled suspension system the combination of a switch in which mercury is shifted, from one position to another, by centrifugal force, to connect spaced contacts and thereby control a circuit; and mercury supporting means for subjecting the mercury to an inclining surface while centrifugal force is increasing, and then, after the mercury is shifted by centrifugal force, for automatically subjecting the mercury to an inclining surface of lesser degree than the first-mentioned inclining surface.

4. In a vehicle provided with a controlled suspension system the combination of a switch wherein mercury, contained in a horizontally extending container, is shifted, from one level to a higher level, by centrifugal force, to connect spaced contacts and thereby control a circuit; and means for causing shifting of the angle of the container toward horizontal after the mercury is shifted by centrifugal force of a predetermined magnitude, said means being operatively responsive to said vehicle encountering said predetermined magnitude of centrifugal force.

5. In a vehicle provided with a controlled suspension system the combination of a switch wherein mercury, contained in a horizontally extending container, is shifted, from one level to a higher level, by centrifugal force, to connect spaced contacts and thereby control a circuit; means for causing shifting of the angle of the container toward horizontal after the mercury is shifted by centrifugal force of a predetermined magnitude, said means being operatively responsive to said vehicle encountering said predetermined magnitude of centrifugal force; means for causing the container to be held in the position in which it is shifted; and means for causing the container to be shifted away from horizontal after the centrifugal force is decreased to a magnitude less than the magnitude at which the first-mentioned shifting was effected by centrifugal force.

6. In a vehicle provided with a controlled suspension system the combination of a switch wherein mercury, contained in a horizontally extending container, is shifted, from one level to a higher level, by centrifugal force, to connect spaced contacts and thereby control a circuit; and means responsive to said mercury encountering centrifugal force for shifting the angle of the container toward horizontal while the mercury is being shifted by centrifugal force of a predetermined magnitude; means for causing the container to be held in the position in which it is shifted; and means for causing the container to be shifted away from horizontal after the centrifugal force is decreased to a value less than the value at which the first-mentioned shifting was effected by centrifugal force.

7. In a vehicle provided with a controlled suspension system the combination of a switch wherein mercury, contained in a pivotally mounted, horizontally elongated container, is shifted from the lower end of the container to the other and higher end of the container; spaced contacts in said higher end for controlling a circuit for said system; means for causing the mercury to be shifted from said one end of the container to said other end by centrifugal force; and means for utilizing the movement of the mass of the mercury to effect tilting of the container to thereby change the floor angle of the container.

8. In a vehicle of the type provided with apparatus for improving cornering characteristics in negotiating a curve by varying suspending energies stored between the sprung and unsprung weights which apparatus includes resilient means on opposite sides of the vehicle operatively connected between the sprung and unsprung weights, control means for one of the resilient means at one side of the vehicle, and control means for the other of said resilient means at the opposite side of the vehicle; the combination of means for causing mercury to be shifted from one level to a higher level by the centrifugal force which is generated as the vehicle negotiates a curve; spaced contacts connectable by said mercury for controlling an electric circuit; means responsive to said vehicle encountering centrifugal force for decreasing the effect of the moment of force of gravity, on the mercury, after the moment of force of centrifugal force attains a predetermined magnitude, said control means being connected in said circuit whereby shifting of the mercury when the centrifugal force attains said predetermined magnitude causes the control means, nearer the center of the curve, to confine the expendable energy of resilient means which is nearer the center of the curve.

9. In a vehicle of the type provided with apparatus for improving cornering characteristics in negotiating a curve by varying suspending energies stored between the sprung and unsprung weights which apparatus includes resilient means on opposite sides of the vehicle operatively connected between the sprung and unsprung weights; control means for one of the resilient means at one side of the vehicle; control means for the other of said resilient means at the opposite side of the vehicle; the combination of means for causing mercury to be shifted from one level to a higher level by the centrifugal force which is generated as the vehicle negotiates a curve; spaced contacts connectable by said mercury for controlling an electric circuit; means for automatically decreasing the effect of the moment of force of gravity, on the mercury, after the moment of force of centrifugal force attains a predetermined magnitude, said control means being connected in said circuit whereby shifting of the mercury when the centrifugal force attains said predetermined magnitude causes the control means, nearer the center of the curve, to confine the expendable energy of resilient means which is nearer the center of the curve; and means for thereafter maintaining the decreased effect of the moment of force of gravity, on the mercury, until the moment of force of centrifugal force decreases to a magnitude below said predetermined magnitude.

10. An electric switch including a horizontally elongated closed tube; mercury within and filling only part of said tube, said mercury being adapted to be moved from a static position to a high level in the tube when subjected to centrifugal force; spaced contacts in said tube and connectable by said mercury at said high level; and means responsive to centrifugal force encountered by said switch for causing decreasing effect of the moment of force of gravity, on the mercury, after the moment of force of centrifugal force attains a predetermined high value.

11. An electric switch as defined in claim 10, characterized in that the tube is mounted for pivotal movement.

12. An electric switch as defined in claim 10, characterized in that the tube is mounted for pivotal movement on a substantially horizontal axis disposed transversely of the elongated tube.

13. An electric switch as defined in claim 10, characterized in that the tube is mounted for pivotal movement, and further characterized to include electromagnetic means energized through the mercury and adapted when energized to yieldingly urge the tube toward one of its two positions.

14. An electric switch as defined in claim 10, characterized in that the tube is mounted for tilting movement by shifting of the mass of mercury when it is moved from one level to the other.

15. In a vehicle provided with controlled suspension system, the combination of, a switch wherein mercury is shifted from one level to another level to connect spaced contacts and thereby control a circuit, said switch including a horizontally elongated closed tube having a floor, said floor having an inclining surface and another surface of lesser degree of incline merging with the first-mentioned surface; mercury partly filling said tube and movable from said first mentioned surface to said second mentioned surface when centrifugal force encountered by said vehicle attains a predetermined high value, the movement of said mercury onto said second mentioned surface serving to cause a decrease in the effect of the moment of force of gravity, on the mercury, responsive to centrifugal force attaining said predetermined high value; and switch contacts adapted to be bridged by the mercury upon movement of said mercury onto said second mentioned surface.

16. An electric switch including a closed tube provided with an inclined surface; mercury within and filling only part of said tube, said mercury being adapted for movement up said inclined surface when subjected to centrifugal force; spaced contacts in said tube and connectable by said mercury at said high level; means responsive to centrifugal force encountered by said switch for decreasing the angle of inclination of said inclined surface after the moment of force of centrifugal force attains a predetermined value; means for increasing said angle of inclination after a decrease thereof; and means for retarding the rate of increase of inclination of said surface.

17. An electric switch including a closed tube provided with an inclined surface; mercury within and filling only part of said tube, said mercury being adapted for movement up said inclined surface when subjected to centrifugal force; spaced electric contacts in said tube and connectable by said mercury upon movement of said mercury up said inclined surface; electromagnetic means for decreasing the angle of inclination of said inclined surface after the moment of centrifugal force attains a predetermined value, said electromagnetic means being energized by bridging of said contacts by said mercury; means for increasing the angle of inclination of said inclined surface; and a condenser for maintaining said electromagnetic means energized for a time interval after said mercury ceases to bridge said contacts.

References Cited in the file of this patent

UNITED STATES PATENTS

| | | |
|---|---|---|
| 992,631 | Allen | May 16, 1911 |
| 1,107,245 | Bard | Aug. 18, 1914 |
| 2,133,773 | Rossman | Oct. 18, 1938 |
| 2,636,290 | Bell | Apr. 28, 1953 |

FOREIGN PATENTS

| | | |
|---|---|---|
| 1,085,479 | France | July 28, 1954 |